Sept. 16, 1969  J. KEYES ET AL  3,467,014

CLOSE-COUPLED BOOSTER PUMP

Filed May 11, 1967

INVENTORS
J. KEYES
R. R. GREENE
T. E. BOESEN

BY

Phillip A. Weiss
ATTORNEY

United States Patent Office 3,467,014
Patented Sept. 16, 1969

3,467,014
CLOSE-COUPLED BOOSTER PUMP
Jack Keyes, Glencoe, Robert R. Greene, Chicago, and Thomas E. Boesen, Morton Grove, Ill., assignors to International Telephone and Telegraph Corporation, a corporation of Delaware
Filed May 11, 1967, Ser. No. 637,795
Int. Cl. F04d *13/04;* F04b *21/00*
U.S. Cl. 103—87                         5 Claims

ABSTRACT OF THE DISCLOSURE

A close-coupled booster pump for Hydronic heating and cooling systems. The pump is equipped with an eye seal that prevents leakage that could occur as a result of resilient mounts used to isolate the motor. The shaft is equipped to withstand the wide variations in thrust forces acting thereupon and an unique heat sink fan combination is used to protect the motor bearing from the heat of the fluid being pumped.

---

This invention relates to booster pumps such as used in Hydronic heating and cooling systems and more particularly is concerned with close-coupled booster pumps.

The prime requirement of a forced fluid booster pump, such as used in heating and cooling systems is quiet operation. In the past, the necessity for quiet operation has precluded the use of close-coupled booster pumps. Thus, Hydronic systems have utilized electric motor driven booster pumps including complicated and expensive coupling arrangements for connecting the motors to the pumps.

Booster pumps as a rule are coupled directly to and supported by the piping system with the motor cantilevered therefrom. This type of mounting naturally increases the cost of the couplers used and also the difficulty of dampening the motor noise and vibrations without couplers.

The couplers also isolate and hence, protect the motor shafts from the vagracies of the inherently abruptly varying hydraulic forces. In addition, the couplers naturally protect the motor bearings from the heat of the pumped fluid. This protection is afforded primarily by the distance between the fluid in the pumps and the motor.

However, the industry has continuously searched for an effective close-coupled pump, since a close-coupled pump that could prevent the transmission of motor noises and vibration therethrough, among other things, is easier to manufacture and would save premium space. Such a close-coupled pump is also advantageous since it would remove any operational lag caused by the normally used couplers. In addition, close-coupled pumps are less expensive than the pumps using any of the various coupling arrangements.

Accordingly, an object of the present invention is to provide a close-coupled booster pump wherein the pump is effectively isolated from motor vibration and noises.

A further object of the present invention is to provide a closely coupled booster pump having means for protecting the shaft from the adverse effect of variations in hydraulic forces.

A related object of the invention is to provide an effective sealing arrangement at the eye on the suction inlet to the pump.

Yet another object of the invention is to provide a close-coupled booster pump capable of protecting the motor bearings from the heat of the pumped fluid.

An embodiment of the present invention comprises a close coupled booster pump wherein the electric drive motor is rubber ring mounted for vibrational noise insulation. A two directional thrust mechanism enables the shaft to withstand the varying system forces; while a heat-sink type fan protects the motor bearings and end seals from system generated heat that would otherwise be readily conducted and converted toward the motor. An eye seal prevents excessive leakage between the impeller mounted on the movable shaft and the inlet port of the pump. Thus, the inventive close-coupled booster pump overcomes the problems inherent to such a pump thereby providing a pump unit that can be used to replace the more expensive and larger coupler driven pumps.

The aforementioned and other objects and features of the invention will become apparent from the detailed description which follows, taken together with the accompanying drawings, wherein.

Figure 1:
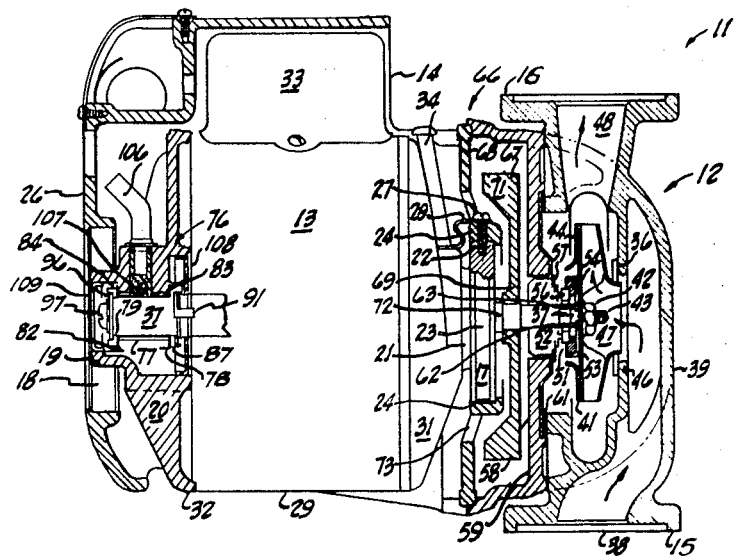
FIG. 1 illustrates in a partially sectional view one preferred embodiment of the inventive close-coupled booster pump.

The close-coupled booster pump assembly 11 of FIG. 1 includes a centrifugal pump 12 and an electric drive motor 13. A motor support casing or bracket 14 supports the motor 13 cantilevered from the pump 12.

The booster pump 11 is coupled into a hydraulic system by connecting it in any well known manner, directly to line flanges at the flanges 15, 16 of the intake and outlet port sections respectively. The coupler of the normal booster pump acts to buffer and insulate the pressured fluid system from motor noises and vibrations that would be transmitted through the drive shaft, for example.

Means are provided for insulating the hydraulic system from noises and vibrations originating at the motor. More particularly, resilient motor mounting rings 17, 18 are located at the front and rear ends of the motor, respectively. The rings visible in the cross-sectional portions of the drawings are mounted on the end casing stubs 19, 21 respectively at the rear and front motor end bells. The resilient mounting rings, as best seen at broken cross-sectional view of ring 17 comprises means such as metallic outer diameter shield 22 for protecting the main resilient body 23 of the ring 17.

Front and rear end openings are provided in the motor support bracket for receiving the resilient mounting rings. Thus, the bracket contiguously surrounds rings 17, 18 at 24, 26, respectively. Fastening means, such as screw 27, is used to keep the motor assembly 13 from rotating about its axis in the support bracket. More particularly, the screw 27 is shown threaded through ring encircling section 24, ring metallic outer diameter section 22 into the rubber or plastic body 23 of the resilient ring 17. The screw 27 may also be used to fasten the motor grounding wire 28 to the bracket 14.

The illustration of the motor shows such well known components as main body section 29, front end bell 31, rear end bell (cross-sectional view) 32 and the well known start-relay and connecting block compartment 33. The front end bell oil channel 34 also appears. The details depicted in the cross-section rear end bell view will be discussed later in this description.

The isolation afforded by the resilient ring mounts would normally be rendered an exercise in futility by the vibrations and noises transmitted along the shaft, the impeller and to the pump casing at the inlet eye region of the pump casing. The normal close tolerances between the cylindrical inlet eye casing region and the impeller stub acts as an ideal vibration and noise transfer mechanism. As is well known to those skilled in the art, the close tolerances are normally required to minimize recirculation losses that are caused by leakage between the pressure portion and suction portions of the volutes. When the pump shaft is coupled to the motor shaft with a normally used resilient coupler the motor noises and vibrations are absorbed and restrained by the coupler and thereby prevented from causing the pump shaft to unduly vibrate against the casing, for example.

Means, such as eye seal 36, are provided for, among other things, precluding the transfer of motor vibrations and noises along the shaft 37 that is common to both the drive motor and the pump in the close-coupled booster pump. As shown in the cross-section view of pump 12 in FIG. 1 the pump comprises a suction or inlet volute passageway 38 in pump casing 39. An impeller 41 is connected to rotate with shaft 37 by means such as nut 42 threaded onto the threaded end section 43 of the shaft 37. The impeller may be of the type described in a copending patent application entitled "Gas Elimination Impeller," filed June 11, 1965, Ser. No. 463,259, and assigned to the assignee of this invention. Thus, the impeller 41 is shown having a rear shroud 44 designed to force the fluid over the shaft seal for proper lubrication and cooling thereof.

It should be noted that the eye seal 36 enables a much greater than normal clearance between the impeller stub at its eye section and the cylindrical portion of the casing 46 that encircles the impeller. This eliminates for all practical purposes the transfer of motor noises and vibrations. In addition, the simplified seal eliminates the need for maintaining exact centering and running clearances at the inlet eye region. This, of course, minimizes the cost of machining and assembling the booster pump. The seal ring 36 is preferably of lubric plastic seal face material or else it can be of carbon, steel, phenolic or any other suitable seal ring material as best suited by the fluid being handled and its operating temperature.

The seal ring 36 as depicted rides on the stub section surrounding and defining the eye of the impeller 41. The ring 36 is forced against the inside wall of section 46 of the pump casing by the pressure differential between the suction at the eye inlet 47 and the outlet pressure in the outlet volute 48. Thus, the eye seal arrangement, among other things, minimizes the transfer of motor noises and vibrations to the hydraulic system. The pump eye casing section particularly is buffered and protected from transverse movement of the pump shaft which may be increased by the resilient motor mounts in the absence of a separate shaft coupling arrangement.

The shaft seal arrangement is shown by way of example, as comprising a rotary seal 51 and stationary cartridge seal 52. The rotary seal comprises a metal cup shaped container 53 spot welded to the impeller 41. A rubber cup gasket 54 is held within the container 53 and acts to retain the ceramic rotary washer portion 56 of the seal. The stationary cartridge seal 52 is held in place over the pump shaft opening by the peripheral ridge 57 which is forced against the shaped seal plate gasket 58 which follows the contours of the rear wall 59 of pump case 39. A gasket 61 completes the pump rear wall seal. The shaft 37 at the seals, is encased in a stainless steel sleeve 62. The sleeve terminates at a copper gasket 63 located between the sleeve 62 and container 53.

When the nut 42 is tightened, the impeller with attached rotary seal 51 pushes against stationary cartridge seal 52. The cartridge seal, in turn, is press fit so that ridge 57 abuts plate 58 to effectively close the shaft entrance port. When the shaft and impeller rotate the ceramic rotary washer also rotates and is abutted by the cartridge seal with a minimum of friction but nevertheless maximizing the compressive sealing of the pump chamber. The shroud 44 insures proper and continuous lubrication of the seal.

The use of a single shaft for both the drive motor and the pump in conjunction with proximity of the pump to the motor introduces problems. More specifically, the system fluid heat is easily conveyed by both conduction and convection to the motor bearing region, thus, decreasing the life and reliability of the motor bearings.

Means, such as heat sink section 66, is provided for dissipating the system heat enroute from the pump 12 to the motor 13. In greater detail, the heat sink section is comprised of pump wall 59, heat sink fan 67 and bracket motor mount section 68.

The wall 59 with seal plate gasket 58 mounted thereon acts as a partial heat shield. The heat transferred therethrough, radiantly and conducted through the shaft is dissipated by the heat sink fan 67 mounted on and rotated with shaft 37. It should be noted that the fan acts not only to dissipate the heat received within the air space of the compartment defined by the pump's rear wall and the motor mount bracket wall 68 but also as a heat sink to absorb and dissipate heat conducted by the shaft 37 from the system fluid.

Figure 2:
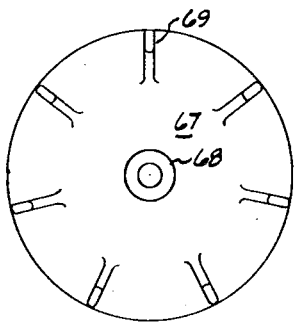
FIG. 2 is a view of a heat-sink fan arrangement taken from the motor side of the fan.

Thus, the fan 67 may be fabricated from a material such as aluminum which is a good heat conductor. The hub section 69 is relatively long; and, since, the fan 67 is press fitted onto the shaft 37 to abut against shoulder 72, efficient heat transfer occurs between the shaft and the fan. As best seen in FIG. 2 the fan 67 is a disk shaped solid bodied heat sink. A plurality of fins or blades such as blade 71 are equally spaced near the outer periphery of the fan. The solid disk increases the heat absorbing and dissipating characteristics of the fan heat sink 67. In addition, as the shaft and fan rotate, the fins or blades agitate the air in the enclosed space and direct the air toward apertures, such as port 73 in the wall 68. The ports act as recirculating holes and enable the heated air to escape. Thus, the heat sink section 66 acts to dissipate the heat generated in the pressurized hydraulic system before it can harm the motor bearings.

Depending on the hydraulic forces acting on the pump, the pump shaft is subjected to forces of tension or compression. When a separate coupling assembly is used the pump shaft has a separate thrust arrangement associated therewith which acts to cushion the motor and pump from the stresses caused by the hydraulic forces. The lack of a pump shaft thrust arrangement, therefore, presents problems since the tension or compression forces are transmitted directly to the motor bearings.

Means, such as the double-thrust arrangement 76 in the rear motor bell bearing assembly, is provided for absorbing the hydraulically initiated tension and compression forces. The shaft 37 is shown surrounded by sleeve bearing 77. The sleeve bearing terminates at stationary thrust washers 78, 79 which serve at the inside and outside ends of the bearing respectively.

Figure 3:
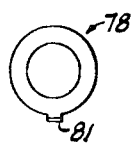
FIGS. 3–8 are illustrations showing details of washers used in the dual thrust mechanism of the drive motor.

As best seen in FIG. 3, the stationary thrust washer is circular shaped to fit over the shaft 37. Means, such as protrusion 81 are provided for preventing the washer from rotating with the shaft. Protrusion 81 fits into a cored hole (not shown) in the end bell to assure that the washer 78 does not rotate.

Figure 4:
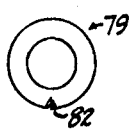
Figures 5A, 5B:
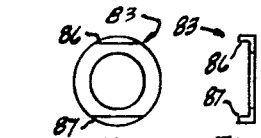

In a similar manner, the outside stationary thrust washer 79 is provided with a V-shaped protrusion 82 as is best seen in FIG. 4. The V-shaped protrusion extends from the washers 79 encircling the shaft into the other end of the above noted cored hole. The V-shape and the spring-steel material enable the washer to remain locked in a stationary position despite shaft vibrations.

The stationary thrust washers abut rotary thrust washers 83, 84 both at the inside and outside ends of the sleeve bearing 77, respectively. Means, such as top and bottom protrusions 86, 87 are provided for locking the inner side thrust washers to the shaft. A circular opening is provided in the washer 83 to slip fit the washer over the shaft. The outside thrust washer 83 is an exact duplicate of washer 83 and is similarly slip fitted over the shaft 37 and equipped with protrusions 86, 87 for locking the rotary thrust washers to drive washers keyed to the shaft.

Figures 6A, 6B:
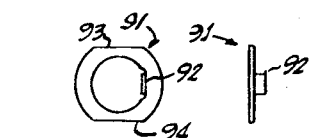

An inside drive washer 91 locks to drive shaft 37. For example, as shown in FIG. 6, the inner diameter of the drive washer 91 is equipped with a key and nipple section 92 which fits over and locks to a flat section of the shaft 37. The outer diameter of the washer 91 is flattened at 93, 94 to key to the protrusions 86, 87, respectively, of thrust washer 83.

Figures 7A, 7B:
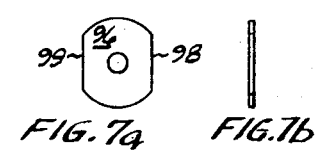

In a similar manner, as best shown in FIG. 7, an outside driver washer is provided. A fastener, such as screw 97, locks the drive washer 96 into place to rotate with the shaft 37. Key sections 98, 99 cooperate with protrusions 86, 87 of thrust washer 84 to lock that washer into rotation with the shaft 37.

Figures 8A, 8B:
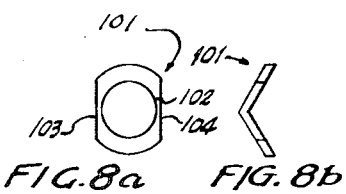

Means are provided for assuring that the shaft extends only a fixed distance past the motor. More specifically, shims, such as shim 101 shown in FIG. 8, may be used between drive washer 96 and thrust washer 84. The shim 101 in its front view (FIG. 8a) is similar in shape to outside washer 96. The shim 101 has an inner diameter hole 102 enabling it to be slip fitted over the shaft 37. Key sections 103. 104 are provided which are designed to cooperate with protrusions 88, 89 of washer 84. In side view (FIG. 8b) the shim 101 is slightly bowed or V-shaped. This provides a resiliency which aids in preventing and cushioning excessive lateral movement of the shaft 37. The shims are used to prevent the shaft 37 from extending too far beyond the motor; thereby reducing end play.

The motor end bell is equipped with bearing lubricating means. For example, an oil receiving tube 106 is provided. The oil tube terminates in oil wicking 107 which extends to the shaft side of the sleeve bearing 77 to keep the bearings properly lubricated. Inside and outside oil retainer cups 108, 109, respectively, are provided to entrap the oil in the end bell to keep the shaft and bearings in a continuous oil bath.

In operation, the close coupled booster pump isolates the system from motor noises and vibrations through the combined action of the resilient motor mounting rings and the unique eye seal. The heat sink section protects the motor from the system heat and the double-thrust arrangement assures that the motor is equipped to withstand the adverse effects of the hydraulic forces which place the drive shaft in tension and in compression.

While the principles of the invention have been described above in connection with specific apparatus and applications, it is to be understood that this description is made only by way of example and not as a limitation on the scope of the invention.

We claim:
1. A close-coupled booster pump assembly,
the combination comprising: pump means for boosting the pressure of a fluid system,
drive motor means for driving said pump,
shaft means common to said motor and said pump,
means for mechanically isolating said motor from said system to exclude the noises and vibrations of said motor from said system,
bracket means depending from said pump for supporting said motor means,
said isolating means including bracket associated means for preventing the transfer of motor noises and vibrations through said bracket means,
said bracket associated means comprising resilient mounting rings at the end bells of said motor,
means on said bracket means for encircling said resilient mounting rings to thereby retain said motor in said bracket,
said isolating means further including shaft associated isolating means,
propeller means in said pump attached to said shaft,
an opening in the casing of said pump aligned with the eyes of the propeller,
said shaft associated means comprising eye seal means located in the space between the outside of said propeller and said eye and the opening in said casing, and
thrust assembly means associated with said common shaft to protect said combination from the adverse effects of compressional and tensional hydraulic forces.

2. The close-coupled booster pump assembly of claim 1, wherein said thrust assembly means comprises a dual thrust washer assembly including sleeve bearing means surrounding said shaft in the outer end bell of said motor, an inner rotary thrust washer between the motor and said sleeve bearing means, means for keying said inner rotary thrust washer to rotate with said shaft, an outer rotary thrust washer at the outside end of said sleeve bearing, means for keying said outer rotary thrust washer to rotate with said shaft, an inner and an outer stationary thrust washer between said rotary thrust washers and said sleeve bearing means, and means for keeping each of said stationary thrust washers from rotating.

3. The close-coupled booster pump assembly of claim 1 including thermal isolation means for protecting said motor from the system heat.

4. The close-coupled booster pump assembly of claim 3 wherein said thermal isolation means includes a compartment between said pump and said motor, heat sink means mounted to rotate on said shaft in said compartment, said heat sink means being disk shaped with fan blade like fins, and aperture means in the rear wall of said compartment for enabling the circulation of air when said heat sink means is rotating.

5. A close-coupled booster pump assembly,
the combination comprising: pump means for boosting the pressure of a fluid system,
drive motor means for driving said pump,
shaft means common to said motor and said pump,
means for mechanically isolating said motor from said system to exclude the noises and vibrations of the motor from said system,
bracket means depending from said pump for supporting said motor means,
said isolating means including bracket associated means for preventing the transfer of motor noises and vibrations through said bracket means,
said bracket associated means comprising resilient mounting rings at the end bells of said motor,
means on said bracket means for encircling said resilient mounting rings to thereby retain said motor in said bracket, and
thermal isolation means mounted on said shaft means between said motor and said pump for protecting said motor from said system heat.

References Cited
UNITED STATES PATENTS

| | | | |
|---|---|---|---|
| 2,459,036 | 1/1948 | Lipe et al. | 103—87 |
| 2,735,027 | 2/1956 | Formhals et al. | 230—209 XR |
| 2,928,961 | 3/1960 | Morrill | 230—232 XR |
| 3,185,099 | 5/1965 | Spring | 103—87 |
| 3,203,353 | 8/1965 | Ruby | 103—87 |

ROBERT M. WALKER, Primary Examiner

U.S. Cl. X.R.
103—218